(12) United States Patent
Choi et al.

(10) Patent No.: US 11,235,663 B2
(45) Date of Patent: Feb. 1, 2022

(54) LEVER TYPE INTEGRATED CONTROL UNIT OF VEHICLE

(71) Applicants: Hyundai Motor Company, Seoul (KR); Kia Motors Corporation, Seoul (KR); SL Corporation, Daegu (KR)

(72) Inventors: Jee Hyuck Choi, Hwaseong-si (KR); Gi Man Park, Daegu (KR); Mo Se Kim, Daegu (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 16/925,163

(22) Filed: Jul. 9, 2020

(65) Prior Publication Data

US 2021/0213829 A1    Jul. 15, 2021

(30) Foreign Application Priority Data

Jan. 14, 2020  (KR) .................. 10-2020-0004787

(51) Int. Cl.
*B60K 26/02* (2006.01)
*B60K 20/02* (2006.01)
(Continued)

(52) U.S. Cl.
CPC ............. *B60K 26/02* (2013.01); *B60K 20/02* (2013.01); *B62D 1/12* (2013.01); *G05G 9/047* (2013.01);
(Continued)

(58) Field of Classification Search
CPC .. B60K 20/02; B60K 26/02; B60K 2026/029; B62D 1/12; B60T 7/08; B60T 7/102; G05G 1/04; G05G 1/06; G05G 9/047; G05G 2009/0474; G05G 2009/04744; G05G 2009/04748; G05G 2009/04751; G05G 2009/04774; G05G 2009/04777
See application file for complete search history.

(56) References Cited

U.S. PATENT DOCUMENTS 5,607,158 A * 3/1997 Chan .................. A63F 13/06
                                                   273/148 B
5,845,735 A * 12/1998 Muller .................. G05G 9/047
                                                   180/322
(Continued)

FOREIGN PATENT DOCUMENTS

EP        1353257 A1 * 10/2003  ............... G05G 1/10
KR    10-2017-0066721 A   6/2017

OTHER PUBLICATIONS https://www.techradar.com/news/i-used-a-ps4-controller-to-drive-a-real-car-remotely-and-it-was-awesome (Year: 2017).*
https://media.daimler.com/marsMediaSite/en/instance/ko/ln-1998-the-Mercedes-Benz-SL-R-129-series-provided-a-glimpse-at-the-future-of-steering.xhtml?oid=9916223.*

*Primary Examiner* — Adam D Rogers
(74) *Attorney, Agent, or Firm* — Morgan, Lewis & Bockius LLP

(57) ABSTRACT

A lever type integrated control unit of a vehicle, may include a lever housing pivotally displaced in a width direction of a vehicle, an acceleration unit located at one end portion of the lever housing and configured to transmit acceleration information related to the vehicle, and an acceleration controller connected to the acceleration unit and configured to receive the acceleration information related to the vehicle from the acceleration unit.

23 Claims, 5 Drawing Sheets

(51) Int. Cl.
  *B62D 1/12* (2006.01)
  *G05G 9/02* (2006.01)
  *G05G 9/047* (2006.01)

(52) U.S. Cl.
  CPC .................. *B60K 2026/029* (2013.01); *G05G 2009/04748* (2013.01); *G05G 2009/04774* (2013.01)

(56) References Cited

U.S. PATENT DOCUMENTS

| | | | | |
|---|---|---|---|---|
| 6,145,401 | A * | 11/2000 | Brush | F16H 59/02 74/473.12 |
| 6,624,806 | B2 * | 9/2003 | Hsu | G05G 9/04788 273/148 B |
| 7,178,613 | B2 * | 2/2007 | Yanaka | B62D 1/12 180/333 |
| 9,055,719 | B2 * | 6/2015 | Bowman | A01G 23/006 |
| 10,421,380 | B2 * | 9/2019 | Keenan | B60N 3/002 |
| 2019/0368599 | A1 * | 12/2019 | Guevara | F16H 59/02 |
| 2019/0375392 | A1 * | 12/2019 | Rake | F16H 59/08 |
| 2020/0271218 | A1 * | 8/2020 | Kreinest | F16H 59/044 |

* cited by examiner

LEVER TYPE INTEGRATED CONTROL UNIT OF VEHICLE

CROSS-REFERENCE TO RELATED APPLICATION

The present application claims priority to Korean Patent Application No. 10-2020-0004787 filed on Jan. 14, 2020, the entire contents of which is incorporated herein for all purposes by this reference.

BACKGROUND OF THE INVENTION

Field of the Invention

The present invention relates to a lever type integrated control unit of a vehicle. More particularly, it relates to a lever type integrated control unit of a vehicle, which employs a system capable of collectively controlling acceleration, steering, deceleration, and gear shifting of a vehicle through a single lever.

Description of Related Art

Generally, to control a vehicle, functions of steering control for adjusting a direction of the vehicle, acceleration control for controlling an acceleration force of the vehicle, braking control for controlling deceleration of the vehicle, and gear shifting control for controlling a driving direction are required.

In the conventional vehicle, a steering wheel for the steering control, an accelerator pedal for the acceleration control, a brake pedal for the braking control, and a gear shifting lever for the gear shifting control are separately mounted so that a driver can control the vehicle.

These driving control devices of the conventional vehicle have a problem that separate portions for performing the functions are mounted in the vehicle so that an internal space of the vehicle is reduced and utilization of the internal space thereof is limited. Furthermore, owing to installation of a plurality of parts, increases in vehicle weight and production cost are caused.

The gear shifting lever is provided in a form of being exposed to an interior of the vehicle through an upper surface of a console between a driver seat and a passenger seat. As described above, the gear shifting lever always exposed to the interior has a disadvantage of causing inconvenience for a passenger when the passenger moves between the driver seat and the passenger seat.

Furthermore, there is a disadvantage in that a storage space, such as a cup holder and a console box, is not largely configured around the gear shifting lever, and operation buttons for operating various convenience devices are not mounted.

Recently, with the development of autonomous driving technology, a large portion of vehicle driving is being automated, and thus a direct control area of a driver is decreasing. As a result of such technological development, the interior of the vehicle is being reduced to a role of a space for adjusting the conventional vehicle and is evolving into a space for rest and leisure when driving.

According to such a trend, there is a demand for the development of a device configured for integrating separate parts mounted for vehicle control to increase utilization of an indoor space and reduce a production cost and a vehicle weight.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a lever type integrated control unit of a vehicle with an integrated system for steering control, acceleration control, braking control, and gear shifting control in a single housing.

In another aspect, various aspects of the present invention provide a lever type integrated control unit of a vehicle, in which an acceleration unit, an acceleration controller, a steering unit, and a steering controller are configured for being connected to be driven.

Objectives of the present invention are not limited to the above-described objectives, and other objectives of the present invention, which are not mentioned, may be understood by the following description and also will be apparently understood through embodiments of the present invention. Furthermore, the objectives of the present invention may be implemented by means described in the appended claims and a combination thereof.

A lever type integrated control unit of a vehicle for achieving the above-described objectives of the present invention includes the following configuration.

In an exemplary embodiment of the present invention, various aspects of the present invention provide a lever type integrated control unit of a vehicle, which includes a lever housing pivotally displaced in a width direction of a vehicle; an acceleration unit located at one end portion of the lever housing and configured to transmit acceleration information related to the vehicle, and an acceleration controller connected to the acceleration unit and configured to receive the acceleration information related to the vehicle from the acceleration unit.

Furthermore, the lever type integrated control unit of a vehicle may further include a hinge housing coupled to a lower end portion of the lever housing and coupled to the lever housing, a steering unit located at a lower end portion of the hinge housing and moveable in a response to displacement of the lever housing and to transmit steering information related to the vehicle, and a steering controller connected to the steering unit and configured to receive the steering information related to the vehicle from the steering unit.

Furthermore, the acceleration unit may include an acceleration switch located at one end portion of the lever housing and selectively rotated and inserted into the lever housing, a slider mounted to be brought into contact with one end portion of the acceleration switch and linearly movable in a response to movement of the acceleration switch, an acceleration magnet fixed to the slider and configured to be linearly moved integrally with the slider, and an acceleration sensor fixed to the one end portion of the lever housing by being spaced at a predetermined distance from the acceleration magnet.

Furthermore, the acceleration sensor may be configured to measure a linear movement amount of the acceleration magnet, transmit information related to the linear movement amount to the acceleration controller, and drive acceleration of the vehicle.

Furthermore, the lever type integrated control unit of a vehicle may further include a return spring located at a distal end portion of the slider, one distal end portion of the acceleration switch may be hinged to the one end portion of the lever housing and the other distal end portion thereof may be inserted into the lever housing, and the return spring may be configured to apply an elastic force to restore a position of the other distal end portion of the acceleration switch.

Furthermore, the steering unit may include a lever hinge portion configured to be pivoted in a response to displacement of the lever housing, a steering magnet fixed to a central axis of the lever hinge portion and configured to be integrally rotated with the lever hinge portion, and a steering sensor fixed to the hinge housing and spaced in a predetermined distance from the steering magnet.

Furthermore, the steering sensor may be configured to measure a rotational amount of the steering magnet, transmit information of the rotational amount to the steering controller, and drive steering of the vehicle.

Furthermore, the lever hinge portion may include a lever hinge fixed to the hinge housing and aligned to pass through an interior of the lever housing to be interlocked with movement of the lever housing, and a torsion spring positioned to be brought into contact with the lever hinge.

Furthermore, the lever hinge may be pivotably displaced at a predetermined angle, and the torsion spring may be configured to apply an elastic force to restore the lever hinge.

Furthermore, the lever type integrated control unit of a vehicle may further include a damper located in the hinge housing by being adjacent to the steering unit and configured to generate a reaction force against a rotation of the steering unit.

Furthermore, the lever type integrated control unit of a vehicle may further include a deceleration button mounted on an upper end portion of the lever housing, a deceleration unit located at one end portion of the deceleration button and configured to transmit deceleration information related to the vehicle, and a deceleration controller connected to the deceleration unit and configured to receive the deceleration information related to the vehicle from the deceleration unit.

Furthermore, the lever type integrated control unit of a vehicle may further include a gear shifting button located on one side surface of the lever housing and may be configured to control a gear shifting of the vehicle in a response to whether an push input of the gear shifting button is present.

Furthermore, the lever type integrated control unit of a vehicle may be located in an internal material of the vehicle and configured to pop upwards or down with power generated from a driving portion of the vehicle.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
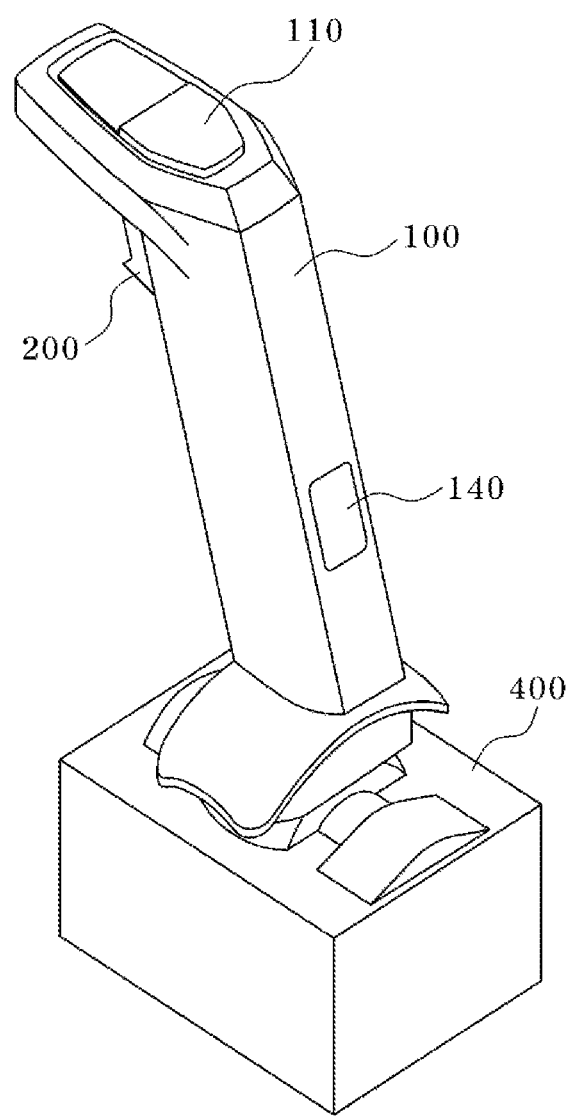
FIG. 1 is a perspective view exemplarily illustrating a lever type integrated control unit of a vehicle according to an exemplary embodiment of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings. The exemplary embodiments of the present invention may be modified in various forms, and the scope of the present invention may not be construed as being limited to the following embodiments. These embodiment are provided to more fully describe the present invention to those skilled in the art.

The terms "~part," "~unit," and the like used herein mean a unit of processing at least one function or operation, and the present unit may be implemented by hardware, software, or a combination of hardware and software.

Furthermore, in the exemplary embodiment, a "width direction" and a "length direction" are based on a vehicle.

Furthermore, in the exemplary embodiment, when a portion is referred to as being "on" or "above" another portion, this includes not only a case in which the portion is "directly on" the another portion but also a case in which yet another portion is present between the portion and the another portion. Furthermore, in the exemplary embodiment, when a portion is referred to as being "below" or "under" another portion, this includes not only a case in which the portion is "directly below" the another portion but also a case in which yet another portion is present between the portion and the another portion.

Furthermore, in the exemplary embodiment, a "clockwise direction" and a "counterclockwise direction" are based on the drawing.

Figure 2:
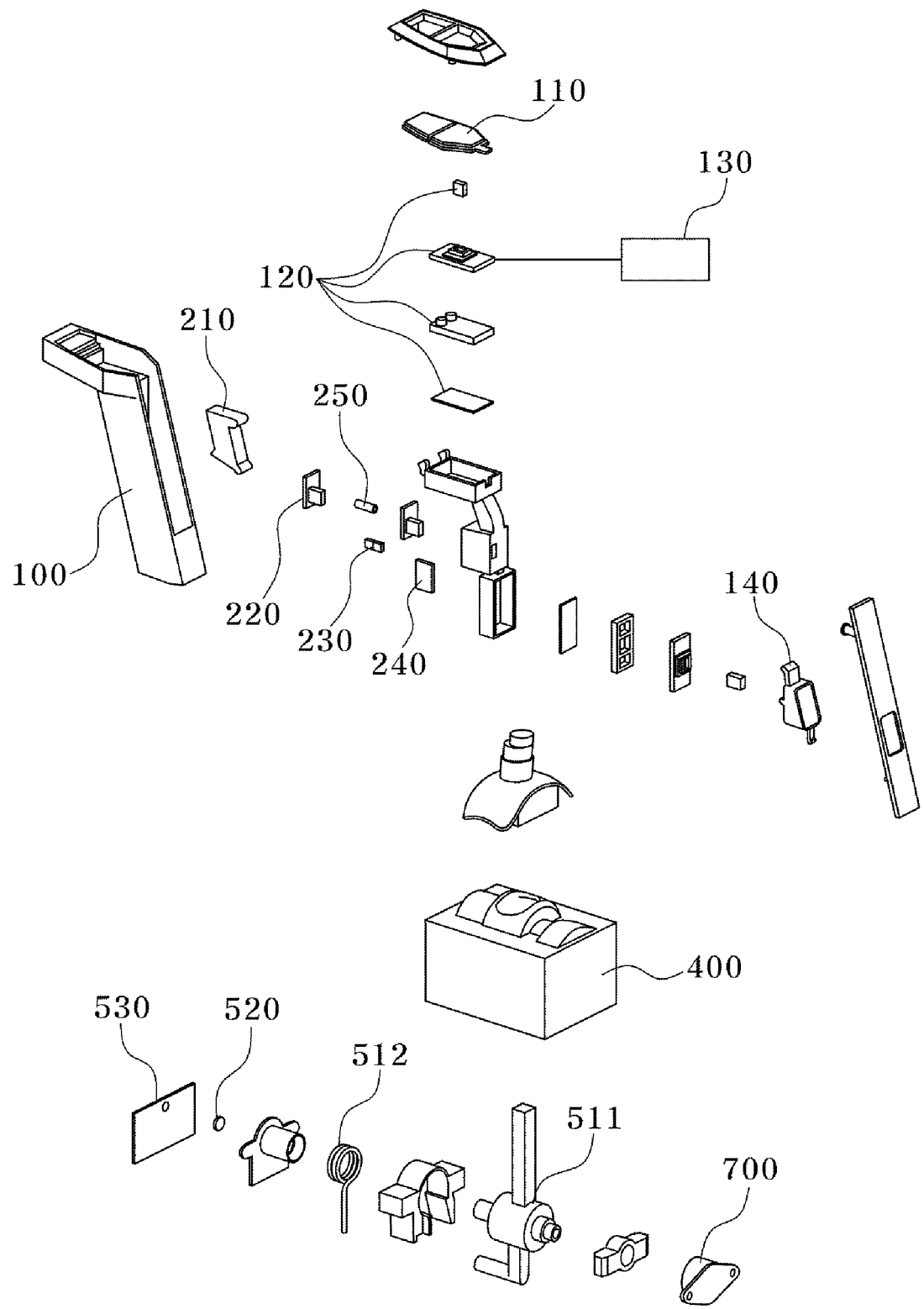
FIG. 2 is a configurational diagram illustrating the lever type integrated control unit of a vehicle according to an exemplary embodiment of the present invention.

FIG. 1 is a perspective view exemplarily illustrating a lever type integrated control unit of a vehicle according to an exemplary embodiment of the present invention, and FIG. 2 is a configurational diagram illustrating the lever type integrated control unit of a vehicle according to an exemplary embodiment of the present invention.

Referring to FIG. 1 and FIG. 2, the lever type integrated control unit of a vehicle according to an exemplary embodiment of the present invention includes a lever housing 100 displaced in a width direction of a vehicle by operation of a driver, an acceleration unit 200 located at one end portion of the lever housing 100 and configured to transmit acceleration information related to the vehicle, and an acceleration controller 300 connected to the acceleration unit 200 and configured to receive the acceleration information related to the vehicle from the acceleration unit 200.

Furthermore, the lever type integrated control unit of a vehicle further includes a hinge housing 400 engaged with a lower end portion of the lever housing 100 and configured to fix the lever housing 100, a steering unit 500 located at a lower end portion of the hinge housing 400 and configured to move in a response to displacement of the lever housing 100 and transmit steering information related to the vehicle, and a steering controller 600 connected to the steering unit 500 and configured to receive the steering information related to the vehicle from the steering unit 500.

The lever housing 100 may be configured to be displaced in the width direction of the vehicle by operation of the driver. The lever housing 100 may be comprised of an external cover brought into contact with a hand of the driver and an internal housing with which various kinds of parts for driving control of the vehicle are engaged.

The acceleration unit 200 may be located at one end portion of the lever housing 100 and configured to transmit the acceleration information related to the vehicle. The acceleration unit 200 may include an acceleration switch 210, a slider 220, an acceleration magnet 230, and an acceleration sensor 240.

The acceleration switch 210 may be located at one end portion of the lever housing 100 and selectively rotated and inserted into the lever housing 100. One distal end portion of the acceleration switch 210 may be hinged to one end portion of the lever housing 100 in a trigger form, and the other distal end portion thereof may be rotated and inserted into the lever housing 100. The acceleration unit 200 may be configured for performing acceleration control of the vehicle while the other distal end portion of the acceleration switch 210 is pressed by operation of the driver.

The slider 220 may be mounted in contact with one end portion of the acceleration switch 210 and configured to linearly move in a response to movement of the acceleration switch 210. The slider 220 may be moved forwards and backwards in a longitudinal direction in a response to a rotation of the acceleration switch 210.

The acceleration magnet 230 may be fixed to the slider 220 and configured to linearly move integrally with the slider 220. The acceleration magnet 230 may be fixedly coupled to one end portion of the slider 220 and configured to move integrally with the slider 220 in the longitudinal direction of the slider 220.

The acceleration sensor 240 may be configured to be fixed to one end portion of the lever housing 100 by being spaced in a predetermined distance from the acceleration magnet 230. The acceleration sensor 240 configured for detecting a magnetic force may be mounted on a circuit board spaced in a predetermined distance from the acceleration magnet 230. The acceleration sensor 240 may be a Hall sensor using a magnet.

The acceleration sensor 240 may convert a magnetic force into an electrical signal. The acceleration sensor 240 may be configured to measure a position of the acceleration magnet 230 using an electrical signal, mainly, a voltage detected by the acceleration sensor 240.

The acceleration controller 300 may be connected to the acceleration unit 200 and configured to receive the acceleration information related to the vehicle from the acceleration unit 200. The acceleration controller 300 may be connected to the acceleration sensor 240 and configured to receive information from the acceleration sensor 240 which detects a linear movement amount of the acceleration magnet 230.

The acceleration controller 300 may be configured to control acceleration of the vehicle by adjusting an engine revolutions per minute (RPM), an opening amount of a throttle valve, and the like on the basis of the received information and communicating with an engine controller of the vehicle.

The hinge housing 400 may be engaged with the lower end portion of the lever housing 100 and configured to fix the lever housing 100. The hinge housing 400 may be configured such that the upper end portion of the lever housing 100 may be displaced in the width direction while the lower end portion of the lever housing 100 is fixed to the hinge housing 400.

The steering unit 500 may be located at the lower end portion of the hinge housing 400 and configured to move in a response to the displacement of the lever housing 100. Furthermore, the steering unit 500 may be configured to transmit the steering information related to the vehicle.

The steering controller 600 may be connected to the steering unit 500 and configured to receive the steering information related to the vehicle from the steering unit 500. The steering controller 600 may be connected to the steering sensor 530 and configured to receive information from the steering sensor 530 which detects a rotation amount of the steering magnet 520.

The lever type integrated control unit of a vehicle according to an exemplary embodiment of the present invention may further include a deceleration button 110 located on an upper end portion of the lever housing 100, a deceleration unit 120 located at one end portion of the deceleration button 110 and configured to transmit deceleration information related to the vehicle, and a deceleration controller 130 connected to the deceleration unit 120 and configured to receive the deceleration information related to the vehicle from the deceleration unit 120.

Furthermore, the lever type integrated control unit of a vehicle may further include a gear shifting button 140 located on one side surface of the lever housing 100 and may be configured to control a gear shifting of the vehicle in a response to whether a push input of the gear shifting button 140 is present.

The deceleration button 110 may be disposed to be exposed at the upper end portion of the lever housing 100. The deceleration button 110 may be comprised of a tact switch. When the driver presses the deceleration button 110, the deceleration button 110 may be configured to perform deceleration control of the vehicle even when the driver does not separately step on a brake.

The deceleration unit 120 may be located at one end portion of the deceleration button 110 and configured to transmit the deceleration information related to the vehicle. The deceleration unit 120 may include a pressure sensor and a printed circuit board and measure a pressure at which the driver presses the deceleration button 110.

The deceleration controller 130 may be connected to the deceleration unit 120 and configured to receive the deceleration information related to the vehicle from the deceleration unit 120. When the deceleration unit 120 measures a pressure value and transmits the measured pressure value, the deceleration controller 130 may be configured to receive information and control a deceleration amount of the vehicle.

In the case of a hybrid vehicle, deceleration may be performed through a motor, a friction brake, an engine RPM, and the like, and in the case of an internal combustion engine vehicle, the deceleration may be performed through an engine RPM, a friction brake, and the like.

The gear shifting button 140 may be located on one side surface of the lever housing 100. The lever type integrated control unit of a vehicle may be configured to switch a driving direction of the vehicle in a response to a push input of the gear shifting button 140 by the driver. When the gear shifting button 140 is pressed while the vehicle is driving forward, the lever type integrated control unit of a vehicle may be configured to drive the vehicle in a rearward direction thereof, and when the gear shifting button 140 is pressed again, the lever type integrated control unit of a vehicle may be configured to switch a driving direction of the vehicle from the rearward direction to a forward direction thereof.

Figure 3:
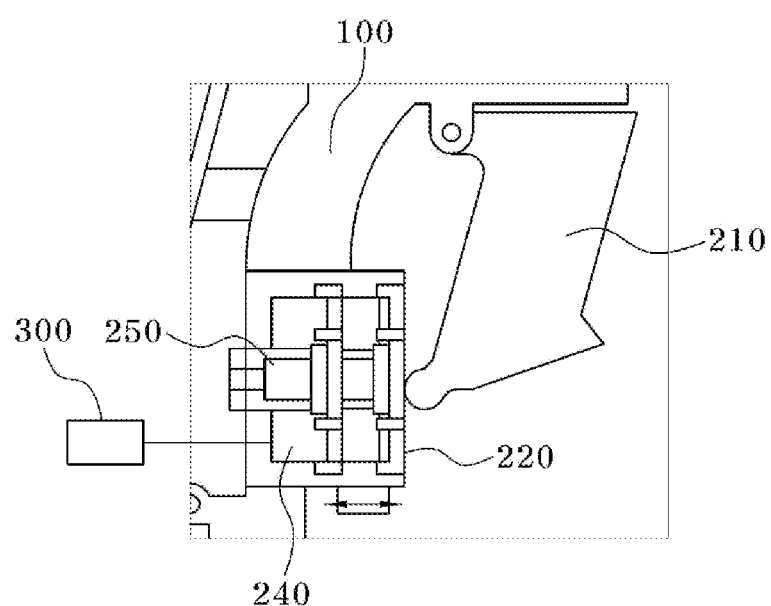
FIG. 3 is a diagram illustrating an acceleration unit and an acceleration controller of the lever type integrated control unit of a vehicle according to an exemplary embodiment of the present invention.

FIG. 3 is a diagram illustrating the acceleration unit 200 and the acceleration controller 300 of the lever type integrated control unit of a vehicle according to an exemplary embodiment of the present invention.

Referring to FIG. 3, the lever type integrated control unit of a vehicle according to an exemplary embodiment of the present invention may further include a return spring 250 located at a distal end portion of the slider 220. Furthermore, the acceleration switch 210 may be configured such that one distal end portion thereof is hinged to one end portion of the lever housing 100 so that the other distal end portion thereof is inserted into the lever housing 100, and the return spring 250 may be configured to apply an elastic force such that a position of the other distal end portion of the acceleration switch 210 is restored.

The return spring 250 may be fixed at a distal end portion of the slider 220. The return spring 250 may be located between one distal end portion of the slider 220 and the internal housing of the lever housing 100 and configured to restore the position of the acceleration switch 210 through the slider 220. When the other distal end portion of the acceleration switch 210 is inserted into the lever housing 100 based on the hinge coupling of the one distal end portion of the acceleration switch 210, the return spring 250 may be configured to apply an elastic force to the other distal end portion of the acceleration switch 210 to restore the position thereof.

While the acceleration switch 210 is pressed to perform a rotational movement, and the slider 220 performs a rectilinear movement by being interlocked with the rotational movement, the return spring 250 may be compressed in the longitudinal direction thereof. When the driver does not press the acceleration switch 210, the return spring 250 extends again, the slider 220 is moved in the longitudinal direction thereof, and the acceleration switch 210 may be configured to perform a rotation by being interlocked with the movement of the slider 220.

Figure 4:
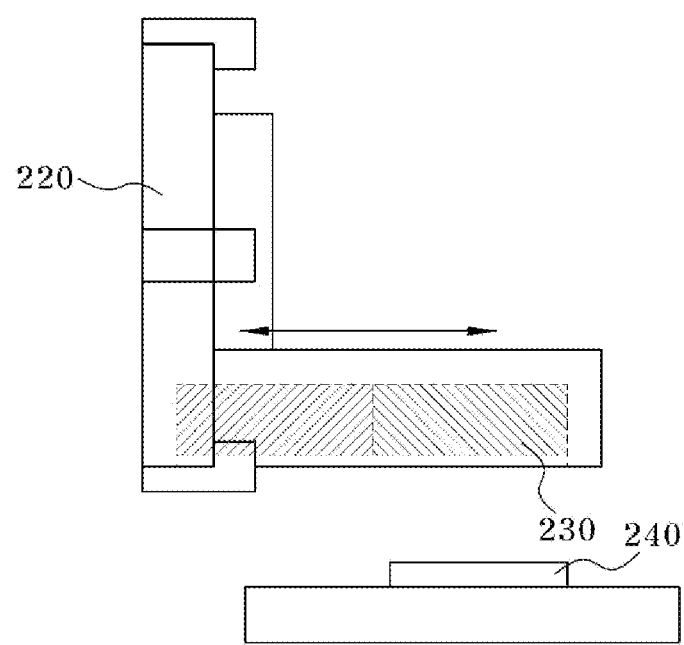
FIG. 4 is a diagram illustrating a driving principle of the acceleration unit of the lever type integrated control unit of a vehicle according to an exemplary embodiment of the present invention.

FIG. 4 is a diagram illustrating a driving principle of the acceleration unit 200 of the lever type integrated control unit of a vehicle according to an exemplary embodiment of the present invention.

Referring to FIG. 4, the acceleration sensor 240 may be configured to measure a linear movement amount of the acceleration magnet 230, transmit information related to the linear movement amount to the acceleration controller 300, and drive acceleration of the vehicle.

The acceleration sensor 240 may be located to be spaced in a predetermined distance from the acceleration magnet 230 and may measure the linear movement amount of the acceleration magnet 230. When the acceleration magnet 230 is linearly moved, a magnetic force may be generated and the acceleration sensor 240 may convert the magnetic force into an electrical signal. The acceleration sensor 240 may be configured to detect a voltage to measure a movement amount of the acceleration magnet 230.

The acceleration sensor 240 measuring the movement amount of the acceleration magnet 230 may transmit information to the acceleration controller 300. The acceleration controller 300 connected to the acceleration sensor 240 may be configured to receive information on a movement amount of the acceleration magnet 230 so that acceleration driving of the vehicle may be driven.

Figure 5:
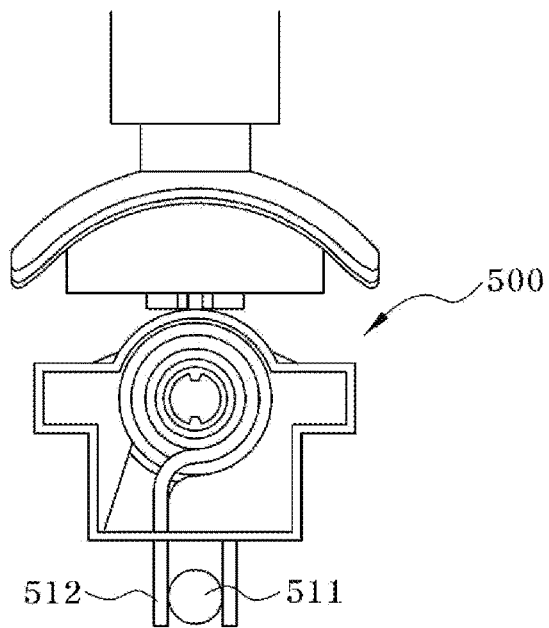
FIG. 5 is a diagram illustrating a steering unit of the lever type integrated control unit of a vehicle according to an exemplary embodiment of the present invention.
Figure 6:
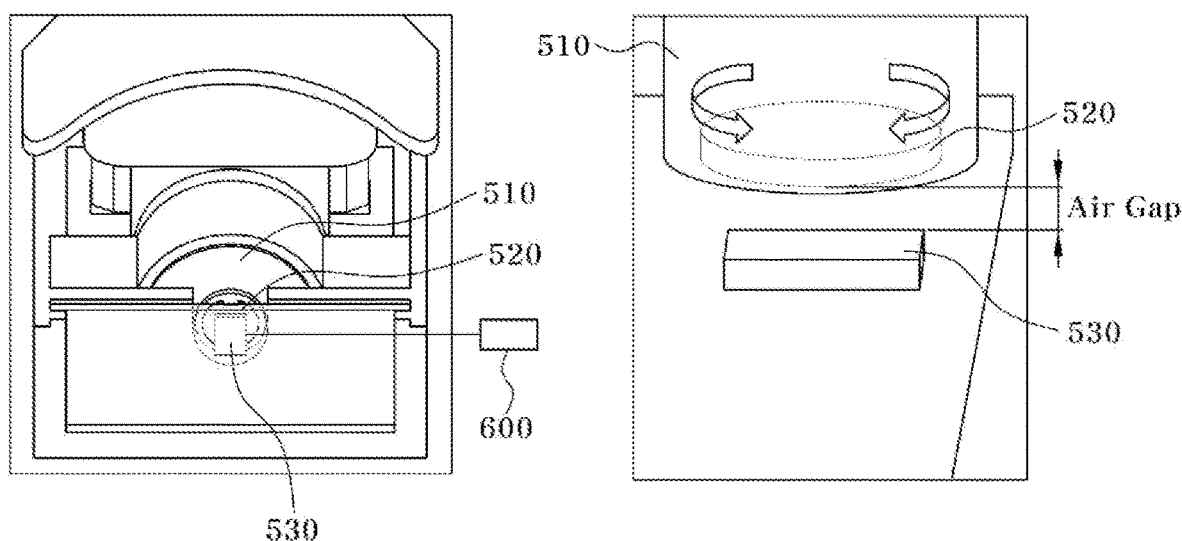
FIG. 6 is a diagram illustrating a driving principle of the steering unit of the lever type integrated control unit of a vehicle according to an exemplary embodiment of the present invention.

FIG. 5 is a diagram illustrating the steering unit 500 of the lever type integrated control unit of a vehicle according to an exemplary embodiment of the present invention, and FIG. 6 is a diagram illustrating a driving principle of the steering unit 500 of the lever type integrated control unit of a vehicle according to an exemplary embodiment of the present invention.

Referring to FIG. 5 and FIG. 6, the steering unit 500 of the lever type integrated control unit of a vehicle according to an exemplary embodiment of the present invention may include a lever hinge portion 510, a steering magnet 520, and a steering sensor 530.

The lever hinge portion 510 may be configured to be pivoted in a response to displacement of the lever housing 100. The lever hinge portion 510 may include a lever hinge 511 fixed in the hinge housing 400 and configured to pass through an interior of the lever housing 100 to be interlocked with the movement of the lever housing 100, and a torsion spring 512 configured to be in contact with the lever hinge 511.

The lever hinge 511 is inserted to pass through the lever housing 100, and when the driver displaces the lever housing 100 in the width direction thereof, the lever hinge 511 may be integrally pivoted with the lever housing 100.

The torsion spring 512 may be configured to be in contact with the lever hinge 511. A protrusion may be formed one distal end portion of the lever hinge 511 in the longitudinal direction thereof. The torsion spring 512 is located coaxially with the lever hinge 511 so that the protrusion of the lever hinge 511 may be caught by one end portion of the torsion spring 512 to apply an elastic force to restore the lever hinge 511.

The torsion spring 512 may be formed on each of front and rear surfaces of the lever hinge 511. For example, when the lever hinge 511 is pivoted in a clockwise direction thereof, the torsion spring 512 mounted on one surface of the lever hinge 511 may apply an elastic force to restore the lever hinge 511 by being pivoted again in a counterclockwise direction thereof. In contrast, when the lever hinge 511 is pivoted in the counterclockwise direction thereof, the torsion spring 512 mounted on the other surface of the lever hinge 511 may apply an elastic force to restore the lever hinge 511 by being pivoted again in the clockwise direction thereof.

The steering magnet 520 may be fixed to a central axis of the lever hinge portion 510 and configured to be integrally pivoted with the lever hinge portion 510. The steering sensor 530 may be fixed in the hinge housing 400 by being spaced in a predetermined distance from the steering magnet 520. Furthermore, the steering sensor 530 may be configured to measure a rotational amount of the steering magnet 520, transmit information of the rotational amount to the steering controller 600, and drive steering of the vehicle.

The steering sensor 530 may be configured to be fixed to the lever hinge portion 510 by being spaced in a predetermined distance from the steering magnet 520. The steering sensor 530 configured for detecting a magnetic force may be disposed on a circuit board spaced in a predetermined distance from the steering magnet 520. The steering sensor 530 may be a Hall sensor using a magnet.

The steering sensor 530 may convert a magnetic force into an electrical signal. The steering sensor 530 may be configured to measure a position of the steering magnet 520 using an electrical signal, mainly, a voltage detected by the steering sensor 530.

The steering sensor 530 may be located to be spaced in a predetermined distance from the steering magnet 520 and may measure a rotation amount of the steering magnet 520. When the steering magnet 520 is linearly moved, a magnetic force may be generated and the steering sensor 530 may convert the magnetic force into an electrical signal. The steering sensor 530 may be configured to detect a voltage to measure a rotational amount of the steering magnet 520.

The steering sensor 530 measuring the rotational amount of the steering magnet 520 may transmit information to the steering controller 600. The steering controller 600 connected to the steering sensor 530 may be configured to receive information on the rotational amount of the steering magnet 520 so that steering of the vehicle may be driven.

Figure 7:
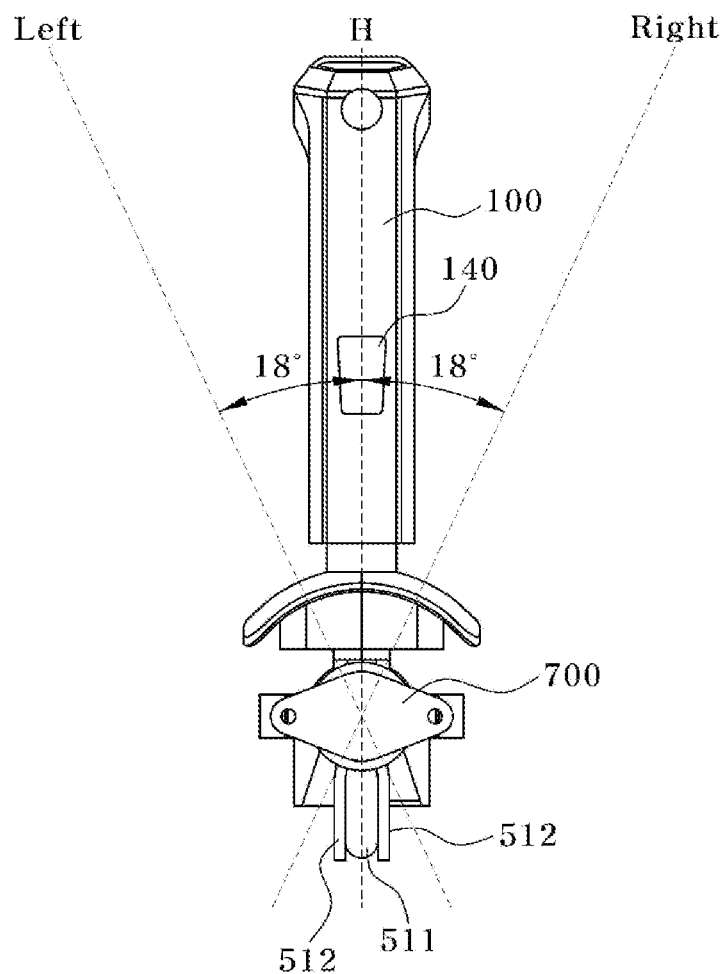
FIG. 7 is a diagram illustrating a steering function driving state of the steering unit of the lever type integrated control unit of a vehicle according to an exemplary embodiment of the present invention.

FIG. 7 is a diagram illustrating a steering function driving state of the steering unit of the lever type integrated control unit of a vehicle according to an exemplary embodiment of the present invention.

Referring to FIG. 7, the lever hinge 511 of the lever type integrated control unit of a vehicle according to an exemplary embodiment of the present invention may be pivoted and displaced at a predetermined angle, and the torsion spring 512 may be configured to apply an elastic force to restore the lever hinge 511. Furthermore, the lever type integrated control unit of a vehicle may further include a damper 700 located in the hinge housing 400 by being adjacent to the steering unit 500 and configured to generate a reaction force against the pivoting of the steering unit 500.

The lever hinge 511 may be pivotably displaced at a predetermined angle in the width direction of the vehicle. When the driver operates the lever housing 100 to displace the lever hinge 511 at a predetermined angle in the clockwise direction thereof, the lever type integrated control unit of a vehicle may be configured to steer a driving direction of the vehicle to a right side thereof. In contrast, when the driver operates the lever housing 100 to displace the lever hinge 511 at a predetermined angle in the counterclockwise direction thereof, the lever type integrated control unit of a vehicle may be configured to steer the driving direction of the vehicle to a left side thereof.

When the lever hinge 511 is pivotably displaced at a predetermined angle in the clockwise direction thereof, the torsion spring 512 may be configured to apply an elastic force such that the lever hinge 511 is pivoted at a predetermined angle in the counterclockwise direction so that a position of the lever hinge 511 is restored. Furthermore, when the lever hinge 511 is pivotably displaced at a predetermined angle in the counterclockwise direction thereof, the torsion spring 512 may be configured to apply an elastic force such that the lever hinge 511 is pivoted again at a predetermined angle in the clockwise direction so that the position of the lever hinge 511 is restored.

The damper 700 may be located in the hinge housing 400 by being adjacent to the steering unit 500. The damper 700 may be configured to generate a reaction force against a rotation of the steering unit 500. The damper 700 may be connected to the hinge housing 400 and configured to prevent the lever hinge 511 from being rapidly pivoted.

For example, the damper 700 may include a rotor having a cylinder in which silicone oil fills and a rotation shaft with a wing and may be configured to generate a rotation. When the rotor rotates, the silicone oil may form resistance against the rotation of the rotor to generate a torque in a direction opposite a rotation direction of the rotor. Owing to the opposite torque of the silicone oil, the damper 700 may be configured to limit rapid pivoting of the lever hinge 511. In addition to using a fluid such as the silicone oil in the damper 700 of the present invention, a damper 700 using a friction plate or an electromagnetic force may be applied, and the present invention is not limited thereto.

The lever type integrated control unit of a vehicle according to an exemplary embodiment of the present invention may be located in an internal material of the vehicle and configured to pop up or down with power generated from a driving portion of the vehicle.

The internal material of the vehicle may be an armrest of a seat. When the driver selects a pop-up function through a specific operating button related to the pop-up function, the lever type integrated control unit of a vehicle embedded in the armrest may pop upwards to be exposed as a usable state. Similarly, when a pop-down function is selected, the lever type integrated control unit of a vehicle externally exposed of the armrest may pop down to be embedded in the armrest.

The driving portion of the vehicle may be an actuator providing a driving force. The driving portion may transmit the driving force generated from the actuator to the lever type integrated control unit of a vehicle such that the lever type integrated control unit of a vehicle pops upwards or downwards.

In another exemplary embodiment of the present invention, when power is applied to the vehicle, the lever type integrated control unit of a vehicle may be configured to automatically pop upwards to be available for use, or when the power of the vehicle is shut off, the lever type integrated control unit of a vehicle may be configured to automatically pop down to be maintained in a storing state. Here, the power applied state may be a starting on state including accessories (ACC) or ignition (IGN) on state.

In brief, various aspects of the present invention provide a lever type integrated control unit of a vehicle, which is configured for reducing separate parts for driving, maximizing utilisation of an indoor space, and reducing a weight of the vehicle by including an integrated system for steering control, acceleration control, braking control, and shift control in a single housing.

The present invention can obtain the following effects according to the above-described configuration, combination, and use relationship.

There is an effect which is configured for reducing separate parts for driving, maximizing utilisation of an indoor space, and reducing a weight of a vehicle by including an integrated system for steering control, acceleration control, braking control, and shift control in a single housing.

Furthermore, there is provided a lever type integrated control unit of a vehicle, which is configured for controlling control acceleration and steering driving by only an operation of a button or only a direction adjustment of a lever by connecting to an acceleration unit, an acceleration controller, a steering unit, and a steering controller to be driven.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

The foregoing detailed description illustrates the present invention. Furthermore, the foregoing is directed to illustrate and describe the exemplary embodiments of the present invention, and the present invention may be used in various other combinations, modifications, and environments. That is, it is possible to make alternations or modifications without departing from the scope of the present invention described herein, equivalents, or within the technical or knowledge scope in the art to which an exemplary embodiment of the present invention pertains. The described embodiments are intended to illustrate the best mode for carrying out the technical spirit of the present invention and various modification can made in the specific applications and utilizes of the present invention. Therefore, the detailed description is not intended to limit the present invention as in the included exemplary embodiments. Furthermore, it may be construed that the appended claims are intended to include another exemplary embodiment of the present invention.

What is claimed is:

1. An integrated control apparatus of a vehicle, the integrated control apparatus comprising:
   a lever housing pivotally displaced in a width direction of the vehicle;
   an acceleration unit located at an end portion of the lever housing and configured to transmit acceleration information related to the vehicle; and
   an acceleration controller connected to the acceleration unit and configured to receive the acceleration information related to the vehicle from the acceleration unit,
   wherein the acceleration unit includes:
   an acceleration switch mounted at the end portion of the lever housing and inserted into the lever housing;
   a slider mounted to be brought into contact with an end portion of the acceleration switch and linearly movable in a response to movement of the acceleration switch;
   an acceleration magnet fixed to the slider and linearly movable with the slider; and an acceleration sensor fixed to the end portion of the lever housing and spaced at a predetermined distance from the acceleration magnet.

2. The integrated control apparatus of claim 1, further including:
a hinge housing coupled to a lower end portion of the lever housing and coupled to the lever housing;
a steering unit located at a lower end portion of the hinge housing and moveable in a response to displacement of the lever housing and configured to transmit steering information related to the vehicle; and
a steering controller connected to the steering unit and configured to receive the steering information related to the vehicle from the steering unit.

3. The integrated control apparatus of claim 1, wherein the acceleration sensor is configured to measure a linear movement amount of the acceleration magnet, transmit information related to the linear movement amount to the acceleration controller, and drive acceleration of the vehicle.

4. The integrated control apparatus of claim 1, further including:
an elastic member located at a distal end portion of the slider,
wherein a first distal end portion of the acceleration switch is hinged to a first end portion of the lever housing and a second distal end portion of the lever housing is inserted into the lever housing, and
wherein the elastic member applies an elastic force to restore a position of a second distal end portion of the acceleration switch.

5. The integrated control apparatus of claim 1, further including:
a deceleration button mounted on an upper end portion of the lever housing;
a deceleration unit located at an end portion of the deceleration button and configured to transmit deceleration information related to the vehicle; and
a deceleration controller connected to the deceleration unit and configured to receive the deceleration information related to the vehicle from the deceleration unit.

6. The integrated control apparatus of claim 1, further including:
a gear shifting button mounted on a side surface of the lever housing,
wherein the integrated control apparatus of the vehicle is configured to control a gear shifting of the vehicle in a response to whether a push input of the gear shifting button is received.

7. The integrated control apparatus of claim 1, wherein the integrated control apparatus is located in an internal material of the vehicle and configured to move up or down with power generated from a driving portion of the vehicle.

8. The integrated control apparatus of claim 2, further including:
a damper located in the hinge housing by being adjacent to the steering unit and configured to generate a reaction force against a rotation of the steering unit.

9. The integrated control apparatus of claim 2, wherein the steering unit includes:
a lever hinge portion pivotable in a response to displacement of the lever housing;
a steering magnet fixed to a central axis of the lever hinge portion and integrally rotatable with the lever hinge portion; and
a steering sensor fixed to the hinge housing and spaced in a predetermined distance from the steering magnet.

10. The integrated control apparatus of claim 9, wherein the steering sensor connected to the steering controller is configured to measure a rotational amount of the steering magnet, transmit information of the rotational amount to the steering controller, and drive steering of the vehicle.

11. The integrated control apparatus of claim 9, wherein the lever hinge portion includes:
a lever hinge fixed to the hinge housing and aligned to pass through an interior of the lever housing to be interlocked with movement of the lever housing; and
a torsion spring positioned to be brought into contact with the lever hinge.

12. The integrated control apparatus of claim 11,
wherein the lever hinge is pivotably displaced at a predetermined angle; and
wherein the torsion spring applies an elastic force to restore the lever hinge.

13. An integrated control apparatus of a vehicle, the integrated control apparatus comprising:
a lever housing pivotally displaced in a width direction of the vehicle;
an acceleration unit located at an end portion of the lever housing and configured to transmit acceleration information related to the vehicle;
an acceleration controller connected to the acceleration unit and configured to receive the acceleration information related to the vehicle from the acceleration unit;
a hinge housing coupled to a lower end portion of the lever housing and coupled to the lever housing;
a steering unit located at a lower end portion of the hinge housing and moveable in a response to displacement of the lever housing and configured to transmit steering information related to the vehicle;
a steering controller connected to the steering unit and configured to receive the steering information related to the vehicle from the steering unit; and
a damper located in the hinge housing by being adjacent to the steering unit and configured to generate a reaction force against a rotation of the steering unit.

14. The integrated control apparatus of claim 13, wherein the acceleration unit includes:
an acceleration switch mounted at an end portion of the lever housing and selectively rotated and inserted into the lever housing;
a slider mounted to be brought into contact with an end portion of the acceleration switch and linearly movable in a response to movement of the acceleration switch;
an acceleration magnet fixed to the slider and linearly movable with the slider; and
an acceleration sensor fixed to the end portion of the lever housing and spaced at a predetermined distance from the acceleration magnet.

15. The integrated control apparatus of claim 14, wherein the acceleration sensor is configured to measure a linear movement amount of the acceleration magnet, transmit information related to the linear movement amount to the acceleration controller, and drive acceleration of the vehicle.

16. The integrated control apparatus of claim 14, further including:
an elastic member located at a distal end portion of the slider,
wherein a first distal end portion of the acceleration switch is hinged to a first end portion of the lever housing and a second distal end portion of the lever housing is inserted into the lever housing, and wherein the elastic member applies an elastic force to restore a position of a second distal end portion of the acceleration switch.

17. The integrated control apparatus of claim 13, wherein the steering unit includes:
   a lever hinge portion pivotable in a response to displacement of the lever housing;
   a steering magnet fixed to a central axis of the lever hinge portion and integrally rotatable with the lever hinge portion; and
   a steering sensor fixed to the hinge housing and spaced in a predetermined distance from the steering magnet.

18. The integrated control apparatus of claim 17, wherein the steering sensor connected to the steering controller is configured to measure a rotational amount of the steering magnet, transmit information of the rotational amount to the steering controller, and drive steering of the vehicle.

19. The integrated control apparatus of claim 17, wherein the lever hinge portion includes:
   a lever hinge fixed to the hinge housing and aligned to pass through an interior of the lever housing to be interlocked with movement of the lever housing; and
   a torsion spring positioned to be brought into contact with the lever hinge.

20. The integrated control apparatus of claim 19,
   wherein the lever hinge is pivotably displaced at a predetermined angle; and
   wherein the torsion spring applies an elastic force to restore the lever hinge.

21. The integrated control apparatus of claim 13, further including:
   a deceleration button mounted on an upper end portion of the lever housing;
   a deceleration unit located at an end portion of the deceleration button and configured to transmit deceleration information related to the vehicle; and
   a deceleration controller connected to the deceleration unit and configured to receive the deceleration information related to the vehicle from the deceleration unit.

22. The integrated control apparatus of claim 13, further including:
   a gear shifting button mounted on a side surface of the lever housing,
   wherein the integrated control apparatus of the vehicle is configured to control a gear shifting of the vehicle in a response to whether a push input of the gear shifting button is received.

23. The integrated control apparatus of claim 13, wherein the integrated control apparatus is located in an internal material of the vehicle and configured to move up or down with power generated from a driving portion of the vehicle.

* * * * *